United States Patent [19]
Cloke et al.

[11] Patent Number: 5,822,143
[45] Date of Patent: Oct. 13, 1998

[54] DECISION FEEDBACK EQUALIZATION IMPLEMENTATION OF PARTIAL-RESPONSE SIGNALING IN A MAGNETIC RECORDING CHANNEL

[75] Inventors: Robert Leslie Cloke, Santa Clara; Patrick James Lee, San Jose, both of Calif.

[73] Assignee: Western Digital Corporation, Irvine, Calif.

[21] Appl. No.: 661,573

[22] Filed: Jun. 11, 1996

[51] Int. Cl.$^6$ ........................................................ G11B 5/35
[52] U.S. Cl. .............................. 360/65; 360/51; 371/21.1; 371/43.6; 375/233
[58] Field of Search .................................. 360/46, 48, 51, 360/65, 25, 66, 45; 375/232, 233, 291, 355, 376; 364/488, 724.19; 327/79, 7, 156; 371/43.6, 21.1

[56] References Cited

U.S. PATENT DOCUMENTS

| | | | |
|---|---|---|---|
| 4,365,206 | 12/1982 | Rehfeldt | 330/260 |
| 4,520,489 | 5/1985 | Hogge, Jr. | 375/233 |
| 4,583,234 | 4/1986 | Ramadan | 375/232 |
| 4,644,564 | 2/1987 | Dolivo et al. | 375/291 |
| 5,003,555 | 3/1991 | Bergmans | 375/233 |
| 5,132,988 | 7/1992 | Fisher et al. | 375/233 |
| 5,341,249 | 8/1994 | Abbott et al. | 360/46 |
| 5,345,342 | 9/1994 | Abbott et al. | 360/48 |
| 5,381,359 | 1/1995 | Abbott et al. | 364/724.19 |
| 5,384,671 | 1/1995 | Fisher et al. | 360/51 |
| 5,422,760 | 6/1995 | Abbott et al. | 360/46 |
| 5,430,661 | 7/1995 | Fisher et al. | 364/488 |
| 5,606,464 | 2/1997 | Agazzi et al. | 360/46 |

OTHER PUBLICATIONS

Schweber, "Disk-Drive Read Channels Take Different Approaches", *EDN* vol. 40 No. 26, p. 13, 21 Dec. 1995.

Ohr, "Digital Read Channels Come Into the Open", *Computer Design* vol. 32, No. 4, p. 48, Apr. 1993.

Abbot et al., "Timing Recovery For Adaptive Decision Feedback Equalization of Magnetic Storage Channel", *IEEE GLOBECOM '90*, pp. 1794–1799, 02 Dec. 1990.

Fisher et al., "An Adaptive DFE for Storage Channels Suffering From Nonlinear ISI", *IEEE CH2655–9/89/0000–1638*, 1989.

Sawaguchi et al. "Performance Analysis of Decision–Feedback Equalization with Maximum–Likelihood Detector in High–Density Recording Channels", *IEEE Trans. On Magnetics*, vol. 31, No. 6, pp. 3063–3065, Nov. 1995.

*Primary Examiner*—Aristotelis M. Psitos
*Assistant Examiner*—Patrick Wamsley
*Attorney, Agent, or Firm*—Leo J. Young; Milad G. Shara

[57] ABSTRACT

A partial-response maximum-likelihood (PRML) sequence detector with decision feedback equalization (DFE) for a disk drive read channel. The symbol recovery method for a disk drive read channel produces a sequence of samples $X_n$ of a magnetic readback signal with amplitudes representing the readback signal during corresponding sample intervals n=1–N. A DFE circuit generates a sequence of equalized samples $y_n$ and includes a feed-forward filter that removes precursor ISI from the sequence of sample signals $x_n$ to produce a sequence of feed-forward equalized samples $w_n$, detection logic that translates the sequence of equalized samples $y_n$ into a sequence of detected symbols $\hat{y}_n$, and a feedback filter that filters the sequence of detected symbols $\hat{y}_n$ to produce a sequence of equalization feedback values $e_n$ to offset postcursor ISI remaining in the sequence of feed-forward equalized samples $w_n$. A combinational circuit receives the feed-forward equalized samples $w_n$ and the feedback values $e_n$ and combines a sample $w_k$ with an equalization feedback value $e_k$ to produce an equalized sample $y_k$ for each sample interval k in the range of k=1–N. A PRML sequence detector, such as a Viterbi detector, is used with the DFE circuit to recover a user data symbol $\hat{a}_k$ for sample interval k corresponding to the equalized sample $y_k$ in response to the sequence of equalized samples $y_n$. The detected symbols $\hat{y}_n$ used in the feedback path are generated using separate detectors, which allows for feedback with a delay of only one sample interval.

42 Claims, 5 Drawing Sheets

DECISION FEEDBACK EQUALIZATION IMPLEMENTATION OF PARTIAL-RESPONSE SIGNALING IN A MAGNETIC RECORDING CHANNEL

BACKGROUND OF THE INVENTION

1. Field of the Invention

This invention relates to high density magnetic data storage devices, and techniques for reading data from such devices. More particularly, this invention relates to processing of a read channel in a hard disk drive using partial-response maximum-likelihood (PRML) techniques in combination with decision feedback equalization (DFE).

2. Description of Related Art

Signal processing in the read channel for magnetic recording devices is becoming critical for increasing the density at which data can be stored on magnetic media. Signal processing for translating read channel signals to user data symbols in high density systems must account for the effect of more than one sample interval to determine the symbol represented by a single sample interval. This effect is called channel memory. Channel memory can be introduced in the read channel through the inter-symbol interference (ISI) that is inherent in high density magnetic recording read channels, or by encoding the data stream, for example with finite state codes, such as sliding block, convolutional, matched spectral null, or trellis codes.

Typically, data is recovered from channels having finite channel memory using a Viterbi procedure or other sequential detection methods. Basically, the Viterbi procedure is a recursive procedure based on a finite state representation of the channel. Given the actual read back sample sequence, $y_0$, $y_1, \ldots y_n$, the Viterbi procedure determines the best path (most likely sequence of symbols from a finite alphabet) ending in each state j, where state j represents the memory in the channel, by comparing the samples in the sample sequence $y_0, y_1, \ldots y_n$ to the expected sequence of read back samples associated with all possible paths that can end in state j at time n. With partial-response techniques that account for ISI, the number of symbols in the alphabet is more than 2, such as three symbols, five symbols or more, for any given sample $y_n$ in the read back sequence.

The "best path" is determined typically by comparing the Euclidean distance between the actual and expected read back sample sequences. This Euclidean distance is often referred to as the state metric (also called the path metric). The best path ending in state j is often defined to be the expected read back sample sequence with the smallest state metric. As known in the art, the state metric can be defined in terms other than the Euclidean distance.

The Viterbi procedure is efficient because the best path ending in each state at time n and the associated state metric can be determined recursively. Specifically, let $\mu_n(j)$ to be the state metric associated with the best path ending in state j at time n, and $d_0(j), d_1(j), \ldots, d_n(j)$ be the sequence of expected readback samples associated with the best path ending in state j at time n.

In the Viterbi procedure, for each state j in the symbol sequence $d_0(j) \, d_1(j), \ldots, d_n(j)$ and, $\mu_{n+1}(j)$ are determined by $y_{n+1}$, the actual readback sample at time n+1, and the previously determined quantities $\mu_n(k)$ and $d_0(k), d_1(k), \ldots, d_n(k)$. As a consequence, the Viterbi detector must have these quantities stored in its internal memory. Further, since the primary function of the Viterbi detector is to produce estimates of the user data, it must also store (or regenerate) $\hat{a}_0(j), \hat{a}_1(j), \ldots \hat{a}_n(j)$, the sequence of user symbols associated with the best path ending in state j at time n.

The Viterbi detector was originally described as a means of estimating the most likely sequence of user symbols (i.e. user message), which suggests that it cannot generate an estimate until the entire message has been received and processed. However, as is well known, this is not necessary, and in practice, there are a variety of techniques that can be used to force the Viterbi detector to generate estimates of the user data with a predetermined maximum delay and with minimal impact on performance. One common method is, at time n, to force the Viterbi detector to output $\hat{a}_n(s^*)$, the oldest user symbol associated with the best path ending in state $s^*$, where $s^*$ is defined such that $\mu_n(s^*) \leq \mu_n(j)$ for all $j=1, 2 \ldots, S$ where S is the number of states and x is the maximum memory depth of the Viterbi detector (i.e. for each state, the Viterbi detector only remembers the most recent x expected readback samples and user data symbols associated with the best path ending in that state).

PRML sequential detection techniques, such as the Viterbi procedure, can be further improved with equalization of the readback signal. Particularly, when ISI is present it is often necessary to limit the extent of the channel memory by means of an equalizer. Essentially, the equalizer is a filter that modifies the readback signal such that it conforms to a desired shape. In the prior art, only feed-forward equalization has been used with PRML sequential detection techniques for magnetic recording channels.

Decision feedback equalization (DFE) is another equalization technique used for the purposes of improving recording density and noise immunity. DFE is based on detecting a symbol from a finite symbol alphabet for the data channel being read for each equalized sample in the channel. This detected symbol is then fed back through a filter for the purposes of generating an equalization parameter that is combined with an input sample to produce the next equalized sample. More accurate equalization is provided with DFE because inter-symbol interference is removed using noiseless information produced by a symbol detector in the DFE feedback loop, rather than using the noisy input information from the read channel samples, as done with normal feed-forward equalization.

DFE and PRML techniques have been combined for data transmission in the field of digital communications by Bergmans, U.S. Pat. No. 5,003,555. However, signal processing in digital communication is known to be substantially different from that applied to magnetic recording channels. See, Fisher, et al., *An Adaptive DFE for Storage Channels Suffering From Nonlinear ISI*, IEEE (1989) (CH2655 - 9/89/0000–1638).

The typical DFE is used as a combined equalizer and a detector, where the user symbols are generated on a symbol by symbol basis. At least one attempt has been made to apply DFE with a maximum-likelihood detector for a high density data recording channel, as described by Sawaguchi, et al., *IEEE Transactions on Magnetics*, Vol.31, No.6, November 1995, pp.3063–65. The Sawaguchi, et al. approach is based on a fixed-delay tree-search (FDTS) detector originally described by Moon, et al., "Performance Comparison of Detected Methods in Magnetic Recording", *IEEE Transactions on Magnetics*, November 1990. Sawaguchi, et al. replace the symbol by symbol detector of standard DFE with a tree search detector with a depth τ. The feedback loop in the decision feedback equalizer has a inherent delay of one cycle plus the depth τ of the FDTS detector.

The FDTS detector is a variant of what is known in the communication systems literature as a sequential detector. In this approach, the channel is represented by tree structure, where each branch represents an expected readback sample sequence of length τ, corresponding to each possible user data sequence $a_{n-\tau}, a_{n-\tau-1}, \ldots a_n$. At time n, the FDTS detector determines ân–τ, by comparing the actual readback samples $y_{n-\tau}, \ldots y_n$ to the expected readback sample sequence associated with each branch of the tree, and selects the branch that is closest to the actual readback sequence in terms of Euclidean distance. In this regard, it is similar to the Viterbi detector. However, FDTS is a suboptimal detection technique relative to the maximum-likelihood sequence detector characterized by the Viterbi procedure. Furthermore, although the Sawaguchi, et al. approach provides some performance improvements, it introduces in the feedback path increased delay equal to the depth σ of the FDTS detector. This can significantly reduce the performance of the time and gain control subsystems in the read channel of the magnetic storage medium. That is, the delay in the feedback path of an FDTS detection is greater than one cycle. Therefore, the feedback value produced by the Sawaguchi, et al. DFE approach is based on samples that precede the current sample by at least two sample periods, and more likely several periods greater than two sample periods. Thus, the channel memory embodied by immediately preceding samples is lost in the feedback loop using the Sawaguchi, et al. approach.

Accordingly, it is desirable to provide a magnetic recording channel that is capable of using a combination of partial-response maximum-likelihood sequential detection, with decision feedback equalization to improve the magnetic recording density that can be achieved, and to reduce the bit error rate of magnetic recording channels.

SUMMARY OF THE INVENTION

This invention recovers symbols from a magnetic recording channel by using a decision feedback equalizer to equalize a read channel sample sequence through a PRML sequence detector. The full benefits of the PRML detection are afforded the user data because a separate symbol detector is used in the DFE loop that allows for more efficient equalizer.

Accordingly, this invention can be characterized as a method for recovering symbols from a magnetic recording channel that comprises the steps of:

producing a readback signal from a magnetic recording medium;

producing a sequence of samples $x_n$ of the readback signal, having amplitudes representing the readback signal during corresponding sample intervals n=1 through N; generating a sequence of equalized samples $y_n$, with decision feedback equalization, including feed-forward filtering the sequence of samples $x_n$ to produce a sequence of feed-forward equalized samples $w_n$, producing a sequence of detected symbols $\hat{y}_n$ from the feed-forward equalized samples, feedback filtering the sequence of detected symbols $\hat{y}_n$ to produce a sequence of equalization feedback values $e_n$, and combining a feed-forward equalized sample $w_k$ for sample interval k with equalization feedback value $e_k$ for sample interval k to produce an equalized sample $y_k$ for sample interval k, wherein k is in the range of 1 through N; and applying a maximum-likelihood sequential detection procedure to recover a symbol $â_k$ corresponding to the equalized sample $y_k$ for sample interval k from the magnetic recording channel in response to the sequence of equalized samples $y_n$.

The step of feed-forward filtering includes applying a FIR filter weighted to produce a substantially causal output, so that precursor ISI is removed to a significant degree. Postcursor ISI is handled to a more substantial degree by the feedback filter in this embodiment. The feedback filtering step includes applying a FIR filter weighted to produce a sequence of equalization values $e_n$ to offset postcursor ISI remaining in the feed-forward equalized samples $w_n$. The statement that the output of the feed-forward filter is substantially causal means that the current sample $w_k$ provides a value reflecting little or no precursor intersymbol interference.

According to another aspect of the invention, the PRML sequential detection procedure is based on a Viterbi detector. Furthermore, the sequence of detected symbols $\hat{y}_n$, is filtered to produce the equalization feedback value $e_k$, includes a detected symbol $\hat{y}_{k-1}$ preceding the equalized sample $y_k$ by one sample interval. Thus, in one embodiment, the feedback filter comprises an FIR filter in which the weight of the detected symbol $\hat{y}_{k-1}$ is non-zero, and in one embodiment may have a substantial weight relative to weights of other detected symbols that precede the equalized sample $y_k$ by more than one sample interval. In one embodiment, the aggregate weight of the detected symbols to $\hat{y}_{k-1}$ is greater than the aggregate weight of any other group of j detected symbols that precede the equalized sample $y_k$ by more than j sample intervals. In the preferred system, j is 5 or less. More preferably, j is 3 or less. In this Way, a symbol detected for a sample interval immediately preceding the current sample interval is used by the feedback step for the purpose of equalizing the current sample. This way, delay through the feedback path is one cycle, and channel memory is not lost in the feedback loop from symbol to symbol. The Viterbi detection provides user data separate from the feedback path, and can be adapted to channels characterized by a various kinds of channel memory.

According to another aspect of the invention, the step of producing a sequence of detected symbols $\hat{y}_n$ in the feedback path includes converting an equalized sample $y_k$ in the sequence of equalized samples in a multilevel detector to a detected symbol $\hat{y}_k$, where the multilevel detector detects more than two levels, such as three levels or five levels.

According to another aspect of the invention, the Viterbi procedure includes a plurality of detector paths including respective sequences of detector path symbols $â_n$, and associates state metrics with the plurality of detector paths. The step of producing a sequence of detected symbols $\hat{y}_n$ for the feedback path includes selecting in response to the state metrics, a detector path in the plurality of detector paths, and providing the sequence of detector path symbols $â_n$ of the selected detector path as a current sequence of detected symbols $\hat{y}_n$.

As mentioned above, the combination of PRML and DFE according to this invention, is particularly suited to data recording channels for magnetic recording media characterized by channel memory. The channel memory according to one aspect of the invention is characterized by ISI defined by a the channel transfer polynomial of the form $P(D)=(1-D)(1+D)^m$, where m is an integer and D is a delay parameter, where the m can be 0 (dicode), 1 (PR4), 2 (EPR4) and so on. Alternatively, the channel memory can comprise encoded channel memory, such as sliding block codes, convolutional codes, matched spectral null (MSN) codes or trellis codes. In yet another alternative, the channel memory comprises a combination of ISI and encoded channel memory.

This invention can also be characterized as a disk drive, which comprises a magnetic recording disk and a readback circuit coupled with a magnetic recording disk that produces the sequence of sample signals $x_n$ of a data channel read from the disk. The sample signals $x_n$ have amplitudes representing the data channel during corresponding sample intervals n=1 through N. A decision feedback equalization circuit generates a sequence of equalized samples $y_n$. The decision feedback equalization circuit includes a feed-forward filter that removes precursor ISI from the sequence of sample signals $x_n$ to produce a sequence of feed-forward equalized samples $w_n$, detection logic that translates the sequence of equalized samples $y_n$ into a sequence of detected symbols $\hat{y}_n$. and a feedback filter that filters the sequence of detected symbols $\hat{y}_n$ to produce a sequence of equalization feedback values $e_n$ to offset postcursor ISI remaining in the sequence of feed-forward equalized samples $w_n$. A combinational circuit, connected to receive the sequence of feed-forward equalized samples $w_n$ and the sequence of feedback values $e_n$, combines a sample $w_k$ for sample interval k with an equalization feedback value $e_k$ for sample interval k to produce an equalized sample $y_k$ for sample interval k, where k is an integer in the range of 1 through N. A PRML sequence detector, such as a Viterbi detector, is used with the DFE circuit to recover a user data symbol $\hat{a}_k$ for sample interval k corresponding to the equalized sample $y_k$ in response to the sequence of equalized samples $y_n$. The detected symbols $\hat{y}_n$ used in the feedback path are generated using separate detectors, which allows for feedback with a delay of only one sample interval.

The readback circuit includes in a preferred system, a transducer that produces a readback signal from the disk, an analog filter connected to the transducer that filters the readback signal to produce a filtered readback signal, and a sampler receiving the analog signal that produces the sequence of sample signals $x_n$ from the filtered readback signal. The detector logic as mentioned above in the feedback path may comprise a multi-level detector, such as a three level detector that translates the equalized sample values into one of three symbols, or a five level detector that translates each of the equalized sample values into one of five symbols. The detected symbols are then fed back through a filter, such as a FIR filter, in which detected symbols from intervals preceding a current interval by 1 to j intervals have substantial weight, where j is preferably 5 or less (but not limited so), for the purpose of producing the equalization feedback values. Alternatively, when using DFE in combination with the Viterbi detector, the detection logic includes logic that selects a detector path in the plurality detector paths of the Viterbi detector in response to the state metrics. The sequence of detector path symbols $\hat{d}_n$ of the selected detector path is applied as the sequence of detected symbols $\hat{y}_n$ used for the purposes of producing the equalization feedback value.

This invention can also be characterized as a read channel processor for recovering symbols from a data channel read from a magnetic recording disk based on DFE and partial-response sequential detection as discussed above. DFE and Viterbi detection is advantageously applied according to this invention in an EPR4 system.

Accordingly, a significant improvement in cost and performance for a magnetic recording channel based on PRML signaling has been provided, based on the use of DFE in combination with PRML sequential detection. The invention offers significant increase in density for a magnetic recording channel with no degradation in bit error rate. It is believed that the density improvement based on the invented signal processing techniques alone is optimistically expected to be as much as 50% without bit error rate degradation.

Other aspects and advantages of this invention can be seen upon review of the figures, the detailed description and the claims that follows.

DETAILED DESCRIPTION OF PREFERRED EMBODIMENTS

Detailed description of preferred embodiments of this invention is provided with respect to the figures.

Figure 1:
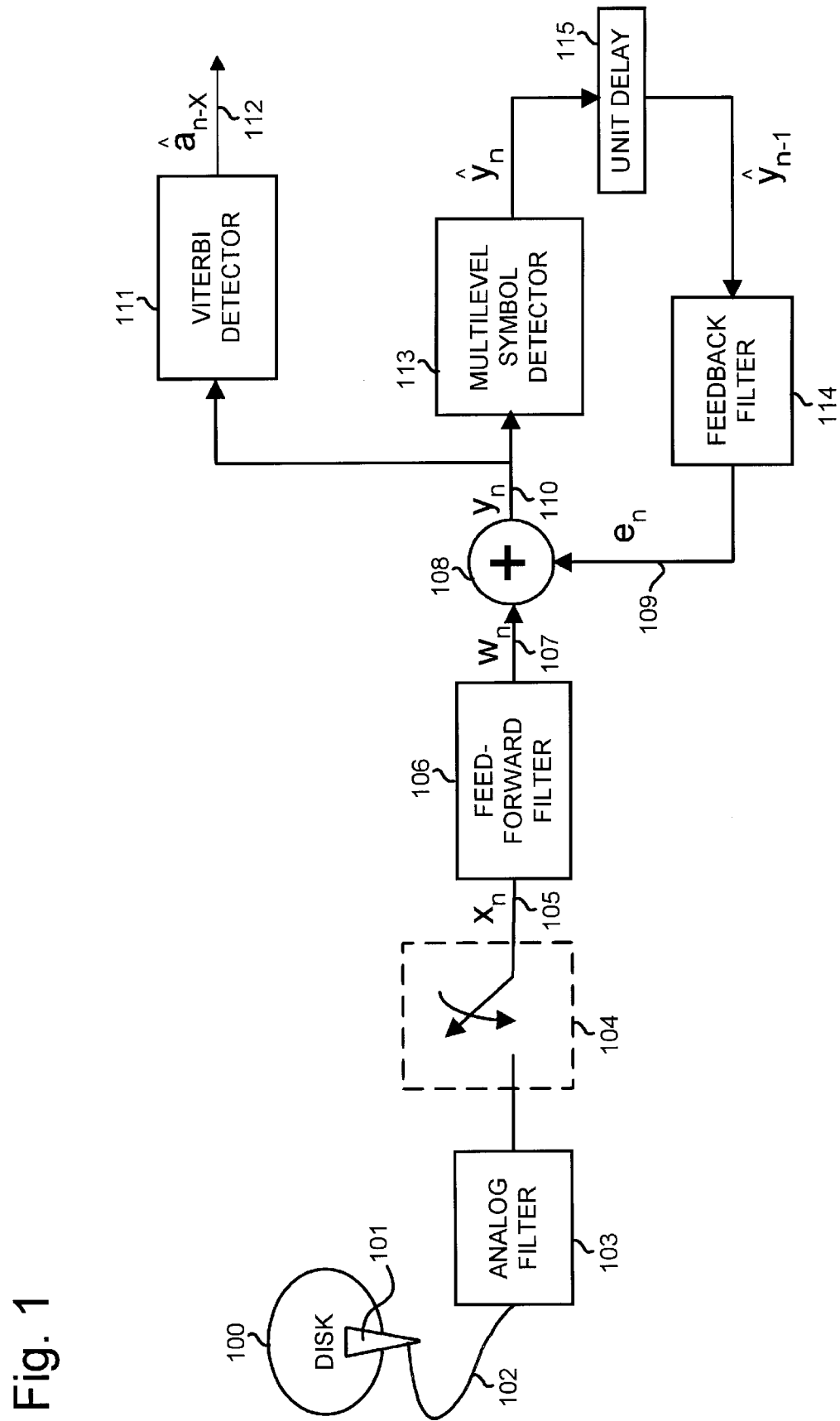
FIG. 1 is a schematic block diagram of a channel for a magnetic recording disk incorporating decision feedback equalization and partial-response maximum-likelihood decoding according to this invention.

An overview of this invention can be seen with reference to FIG. 1, in which a magnetic recording disk 100 is coupled to a transducer 101 used to generate an analog read signal on line 102. The analog read signal on line 102 is applied to an analog filter 103 that is used for anti-aliasing, and/or equalization. The output of the analog filter is applied to a digital sampler 104 that produces a sequence of sample signals $x_n$ on line 105. The sequence of sample signals $x_n$ is applied to a feed-forward filter 106, preferably implemented as a FIR filter for the purposes of feed-forward equalization. The output of the feed-forward filter 106 is a sequence of feed-forward equalized values $w_n$ on line 107. The sequence of feed-forward equalized values $w_n$ are supplied as input to a summing block 108. A second input to the summing block 108 is a sequence of equalization feedback values $e_n$ on line 109. The output of the summing block 108 is sequence of equalized sample values $y_n$ on line 110. The sequence of equalized sample values on line 110 is supplied as input to a Viterbi detector 111, or to another sequence detector for the purposes for producing a sequence of user data symbols $\hat{a}_{n-x}$ on line 112. The depth of the Viterbi detector is x cycles, such that the user symbol $\hat{a}_{n-x}$ is produced x cycles after the current symbol $y_n$ is applied to the Viterbi detector input.

Decision feedback equalization is executed by applying the equalized sample $y_n$ on line 110 as an input to a multi-level symbol detector 113. Multilevel symbol detector 113 slices the sample value $y_n$ into three or more symbols depending on the input symbol alphabet. For a three symbol alphabet, the multilevel symbol detector slices the input sample into one of three symbols. For a five symbol input alphabet such as used in an EPR4 system, the multilevel symbol detector 113 slices the equalized sample $y_n$ into one of five symbols. The symbol $\hat{y}_n$ produced by the multi-level symbol detector 113 is fed back through a feedback filter 114 through a path that includes a unit delay 115 (not necessarily an element separate from the detector, or other parts of the feedback loop), such that the input to the feedback filter 114 includes the symbol $\hat{y}_{n-1}$ corresponding to the equalized sample $y_{n-1}$ for the immediately preceding sample. The feedback filter 114 produces an equalization feedback value $e_n$ on line 109 that is used at the summing block 108 for the purposes of producing the current equalized sample $y_n$.

In the preferred system, the read channel is characterized by channel memory, such as memory induced by intersymbol interference and characterized by a channel transfer polynomial of the form $P(D)=(I-D)(1+D)^m$, where m is an integer, and D is a delay parameter. This channel transfer polynomial is well known, resulting in classes of partial-response channels known as PR4 and EPR4 among others. The PR4 channel is characterized by the channel transfer polynomial above where m=1. The EPR4 channel is characterized by the channel transfer polynomial where m=2. The PR4 polynomial requires a three level multilevel symbol detector, while the EPR4 channel requires a five level detector. For the PR4 channel with DFE according to this invention, the Viterbi detector is defined by the trellis diagram shown in FIG. I A, where in the input sample is defined by Eqn. (1):

$$y_n \triangleq \sum_{k=-z}^{L-z-1} f_k x_{n-k} + \sum_{k=1}^{M} b_k y_{n-k} \approx a_n - a_{n-2} \quad \{0, \pm 1\} \quad \text{[Eqn. (1)]}$$

where: $x_{n-k}$ are the inputs to the FIR filter 106;

$f_k$ are the feed-forward tap weights for the FIR filter 106;

$b_k$ are the feedback tap weights for the FIR filter uses a feedback filter 114;

L is the length of the feed-forward filter in the number of taps;

M is the length of the feedback filter in number of taps; and z is between 0 and L, defined as the delay through the feed-forward filter.

Figure 1A:
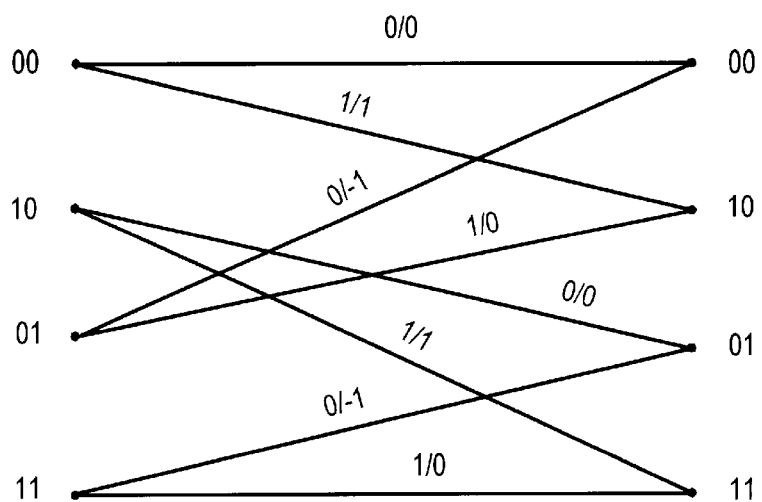
FIG. 1A is a trellis diagram for a PR4 Viterbi detector used in the system of FIG. 1.

Referring to FIG. 1A, note that the edges are labeled a/d where a is the PR4 pre-coder output sequence, and d is the expected channel symbol.

Furthermore, the DFE three level slicer output is defined by Eqn. (2):

$$y_n \triangleq \begin{cases} \text{sign } \{y_n\} \text{ if } |y_n| > 1/2 \\ 0 \text{ otherwise} \end{cases} \quad \text{[Eqn. (2)]}$$

Note that in this system, the DFE detected symbols $\hat{y}_n$ are only used for equalization, and that the detected data sequence $\hat{a}_n$ is determined by the Viterbi detector.

The feed-forward tap weights $f_k$ and the feedback tap weights $b_k$ are chosen to optimize the decision feedback equalization, so that the output of the feed-forward filter is substantially causal, and primarily reduces precursor ISI. The output of the feedback filter provides error values that are used to offset the postcursor ISI that remains in the signal produced at the output of the feed-forward filter. The statement that the output of the feed-forward filter is substantially causal means that the current sample $w_k$ provides a value reflecting little or no precursor intersymbol interference. This is accomplished using a FIR filter having a response that is asymmetrical, balanced to handle precursor ISI well. Postcursor ISI is intended to be handled by the feedback filter in the DFE feedback loop. This is distinguished from classical feed-forward filters, which are typically more symmetrical, intending to cancel both precursor and postcursor ISI.

The feedback filter weights $b_k$ are selected to produce error values that offset the postcursor ISI remaining in the signal at the output of the feed-forward filter. Furthermore, according to this invention, the tap weights on the taps for sample intervals that precede a current sample by one sample interval through j sample intervals, where j is between 5 and 1, have substantial weight. In a preferred system, the sample interval preceding a current sample by one interval has a non-zero weight, and preferably a substantial weight. Further, in the preferred system, the sample intervals that precede the current sample intervals between 1 and 3 intervals, are together weighted with an aggregate weight that exceeds the aggregate weight assigned to any 3 other intervals preceding the current sample interval by more than 3 samples. That is, when the absolute values of the weights are added together to form an aggregate weight, the set of sample intervals closest to the current interval has the most weight.

As known in the art, the tap weights of the filters are adaptively determined depending on the particular system in which the filter is applied. Furthermore, the set of weights applied within a given system can vary substantially depending on the position of the head on the disk during the readback, the particular head and disk combination used, and other factors that are unique to a particular system. Representative sets of feed-forward and feedback tap weights are set forth in the following tables under typical operating conditions.

TABLE 1a

| Example Number | Tap No. −3 | Tap No. −2 | Tap No. −1 | Tap No. 0 | Tap No. 1 |
|---|---|---|---|---|---|
| 1 | −7.00E−02 | 4.51E−02 | −5.20E−01 | 1.41E+00 | 6.57E−01 |
| 2 | −7.57E−02 | 6.41E−02 | −5.46E−01 | 1.42E+00 | 7.66E−01 |
| 3 | −7.75E−02 | 7.13E−02 | −5.56E−01 | 1.41E+00 | 8.95E−01 |
| 4 | −7.64E−02 | 6.97E−02 | −5.53E−01 | 1.37E+00 | 1.04E+00 |
| 5 | −7.33E−02 | 6.27E−02 | −5.43E−01 | 1.32E+00 | 1.18E+00 |
| 6 | −6.96E−02 | 5.36E−02 | −5.30E−01 | 1.27E+00 | 1.32E+00 |
| 7 | −6.47E−02 | 4.61E−02 | −6.11E−01 | 1.42E+00 | 7.16E−01 |
| 8 | −7.69E−02 | 7.90E−02 | −6.61E−01 | 1.45E+00 | 8.11E−01 |
| 9 | −8.44E−02 | 9.74E−02 | −6.88E−01 | 1.44E+00 | 9.25E−01 |
| 10 | −8.73E−02 | 1.03E−01 | −6.97E−01 | 1.41E+00 | 1.06E+00 |
| 11 | −8.69E−02 | 1.00E−01 | −6.91E−01 | 1.36E+00 | 1.21E+00 |
| 12 | −8.45E−02 | 9.24E−02 | −6.78E−01 | 1.30E+00 | 1.35E+00 |
| 13 | −5.37E−02 | 3.74E−02 | −6.95E−01 | 1.43E+00 | 7.95E−01 |

TABLE 1a-continued

| Example Number | Tap No. −3 | Tap No. −2 | Tap No. −1 | Tap No. 0 | Tap No. 1 |
|---|---|---|---|---|---|
| 14 | −7.38E−02 | 8.92E−02 | −7.75E−01 | 1.47E+00 | 8.80E−01 |
| 15 | −8.87E−02 | 1.24E−01 | −8.28E−01 | 1.49E+00 | 9.81E−01 |
| 16 | −9.77E−02 | 1.43E−01 | −8.54E−01 | 1.46E+00 | 1.10E+00 |
| 17 | −1.02E−01 | 1.49E−01 | −8.59E−01 | 1.42E+00 | 1.24E+00 |
| 18 | −1.02E−01 | 1.45E−01 | −8.50E−01 | 1.35E+00 | 1.39E+00 |
| 19 | −3.51E−02 | 1.38E−02 | −7.64E−01 | 1.42E+00 | 8.89E−01 |
| 20 | −6.38E−02 | 8.90E−02 | −8.81E−01 | 1.49E+00 | 9.72E−01 |
| 21 | −8.82E−02 | 1.47E−01 | −9.67E−01 | 1.52E+00 | 1.06E+00 |
| 22 | −1.06E−01 | 1.85E−01 | −1.02E+00 | 1.52E+00 | 1.17E+00 |
| 23 | −1.16E−01 | 2.05E−01 | −1.04E+00 | 1.48E+00 | 1.30E+00 |
| 24 | −1.20E−01 | 2.10E−01 | −1.04E+00 | 1.42E+00 | 1.44E+00 |
| 25 | −7.65E−03 | −2.91E−02 | −8.11E−01 | 1.39E+00 | 9.94E−01 |
| 26 | −4.44E−02 | 7.21E−02 | −9.71E−01 | 1.49E+00 | 1.08E+00 |
| 27 | −7.97E−02 | 1.59E−01 | −1.10E+00 | 1.54E+00 | 1.17E+00 |
| 28 | −1.08E−01 | 2.24E−01 | −1.19E+00 | 1.56E+00 | 1.27E+00 |
| 29 | −1.28E−01 | 2.66E−01 | −1.24E+00 | 1.55E+00 | 1.38E+00 |
| 30 | −1.39E−01 | 2.87E−01 | −1.26E+00 | 1.49E+00 | 1.51E+00 |

Typical feed-forward tap weights are shown in Table 1a for an EPR4/DFE system with five feed-forward and five feedback taps operating on a linear, Lorentzian channel in additive white Gaussian noise (various densities and input signal to noise ratios).

TABLE 1b

| Example Number | Tap No. 1 | Tap No. 2 | Tap No. 3 | Tap No. 4 | Tap No. 5 |
|---|---|---|---|---|---|
| 1 | 2.04E−01 | −3.49E−01 | 1.89E−01 | −1.43E−01 | 4.82E−02 |
| 2 | 1.43E−01 | −3.05E−01 | 1.57E−01 | −1.21E−01 | 3.99E−02 |
| 3 | 7.26E−02 | −2.63E−01 | 1.25E−01 | −1.02E−01 | 3.13E−02 |
| 4 | −2.95E−03 | −2.22E−01 | 9.18E−02 | −8.32E−02 | 2.23E−02 |
| 5 | −7.84E−02 | −1.83E−01 | 6.03E−02 | −6.64E−02 | 1.36E−02 |
| 6 | −1.47E−01 | −1.49E−01 | 3.22E−02 | −5.18E−02 | 5.80E−03 |
| 7 | 1.46E−01 | −3.56E−01 | 1.78E−01 | −1.44E−01 | 4.60E−02 |
| 8 | 8.86E−02 | −3.16E−01 | 1.47E−01 | −1.23E−01 | 3.75E−02 |
| 9 | 2.59E−02 | −2.79E−01 | 1.17E−01 | −1.05E−01 | 2.92E−02 |
| 10 | −4.32E−02 | −2.45E−01 | 8.66E−02 | −8.84E−02 | 2.08E−02 |
| 11 | −1.16E−01 | −2.11E−01 | 5.69E−02 | −7.31E−02 | 1.24E−02 |
| 12 | −1.87E−01 | −1.80E−01 | 2.89E−02 | −5.93E−02 | 4.53E−03 |
| 13 | 9.03E−02 | −3.71E−01 | 1.70E−01 | −1.48E−01 | 4.45E−02 |
| 14 | 3.41E−02 | −3.32E−01 | 1.38E−01 | −1.27E−01 | 3.52E−02 |
| 15 | −2.36E−02 | −2.99E−01 | 1.08E−01 | −1.09E−01 | 2.67E−02 |
| 16 | −8.56E−02 | −2.69E−01 | 7.94E−02 | −9.41E−02 | 1.86E−02 |
| 17 | −1.53E−01 | −2.41E−01 | 5.15E−02 | −8.02E−02 | 1.07E−02 |
| 18 | −2.22E−01 | −2.14E−01 | 2.45E−02 | −6.75E−02 | 2.90E−03 |
| 19 | +4.09E−02 | −3.96E−01 | 1.65E−01 | −1.56E−01 | 4.40E−02 |
| 20 | −1.80E−02 | −3.56E−01 | 1.29E−01 | −1.34E−01 | 3.35E−02 |
| 21 | −7.43E−02 | −3.23E−01 | 9.82E−02 | −1.16E−01 | 2.42E−02 |
| 22 | −1.31E−01 | −2.95E−01 | 7.02E−02 | −1.01E−01 | 1.59E−02 |
| 23 | −1.91E−01 | −2.71E−01 | 4.38E−02 | −8.78E−02 | 8.18E−03 |
| 24 | −2.56E−01 | −2.49E−01 | 1.82E−02 | −7.63E−02 | 6.68E−04 |
| 25 | +9.40E−04 | −4.29E−01 | 1.64E−01 | −1.68E−01 | 4.45E−02 |
| 26 | −6.40E−02 | −3.87E−01 | 1.24E−01 | −1.44E−01 | 3.25E−02 |
| 27 | −1.23E−01 | −3.53E−01 | 8.95E−02 | −1.24E−01 | 2.20E−02 |
| 28 | −1.78E−01 | −3.26E−01 | 6.00E−02 | −1.09E−01 | 1.29E−02 |
| 29 | −2.33E−01 | −3.04E−01 | 3.38E−02 | −9.62E−02 | 5.00E−03 |
| 30 | −2.91E−01 | −2.86E−01 | 9.42E−03 | −8.56E−02 | −2.34E−03 |

Typical feedback tap weights are shown in Table 1b, for an EPR4/DFE system with five feed-forward and five feedback taps operating on a linear, Lorentzian channel in additive white Gaussian noise (various densities and input signal to noise ratios). Note that tap number 1 corresponds to the tap for the sample delayed by one sample interval. Also, the weights for tap number 1 are for the most part substantial (for example, in absolute value, greater than about 1.0E-02). In a preferred system, the weights in Tables 1a and 1b are scaled to avoid using floating point arithmetic. In such scaled systems, weights below about 1.0E-03 might be rounded to zero.

Figure 1B:
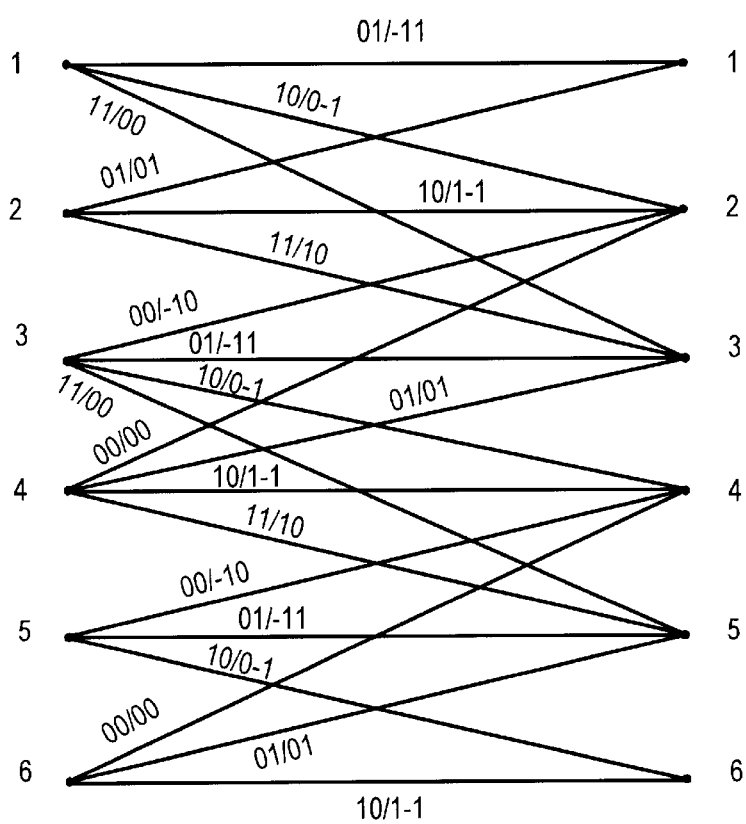
FIG. 1B is a PR4 Viterbi detector trellis diagram for one interleave of rate 8/10 matched spectral null code used in the system of FIG. 1.

In alternative systems, the PR4/DFE process can be supplemented with a trellis encoding in the channel. In one embodiment, the PR4 channel with feed-forward equalization and a Viterbi detector is designed for rate 8/10 matched spectral null (MSN) code, such as described by Karabed, et al., in U.S. Pat. No. 4,888,779 entitled *Matched Spectral Null Trellis Codes for Partial Response Channel*. According to this embodiment, the Viterbi detector is defined by the trellis diagram of FIG. 1B. With respect to the trellis diagram of FIG. 1B:

(1) The edges are labeled $a_1a_2/d_1d_2$, where $a_1a_2$ is a pair of input bits and $d_1d_2$ is the corresponding pair of channel symbols. In particular, $d_1=a_1-a_0$ and $d_2=a_2-a_1$, where $a_0 \in \{0,1\}$ is the "magnetization" associated with each state (i.e. $a_0=0$ for states 2, 4 and 6, and $a_0=1$ otherwise).

(2) As is well known, the Viterbi detector for a PR4 system can be implemented as two 1-D detectors (instead of one 1-D² detector) where one detector operates on the even numbered samples (even interleave) and the other on the odd numbered samples (odd interleave). The trellis diagram in FIG. 1B defines the Viterbi detector on a single interleave. That is the detector is implemented as two detectors, one operating on the even samples and the other on the odd samples, where each detector is defined by the 6-state trellis diagram shown in FIG. 1B.

(3) As can be seen, not every input $a_1a_2$ is allowable from every state (e.g., 01 is not an allowable input for state 1). This is because the rate 8/10 MSN defines a "suboptimal" Viterbi detector, where it is assumed that the input sequences $\{a_n\}$, have been constrained by a (rate 8/10) sliding block encoder such that the only allowable sequences are those defined by the trellis in FIG. 1B.

Figure 1C:
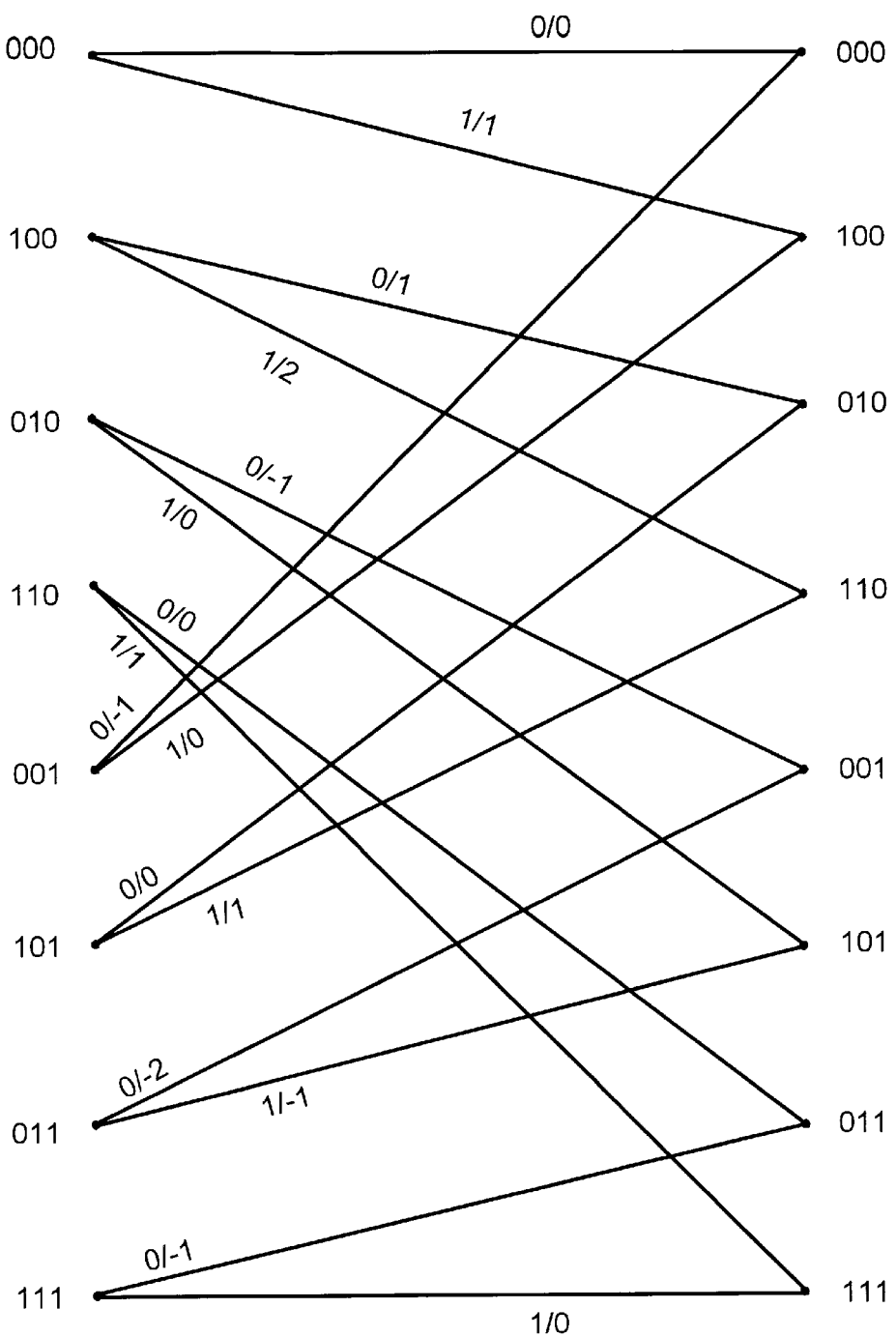
FIG. 1C is an EPR4 Viterbi detector trellis diagram used in the system of FIG. 1.

In another embodiment of this invention, an EPR4 channel is used with decision feedback equalization. An EPR4 channel is characterized by the channel polynomial referred to above where m is equal to two. The input samples to Viterbi detector for the EPR4 procedure satisfy the Eqn. (3)

$$y_n \triangleq \sum_{k=-d}^{L-d-1} f_k x_{n-k} \approx a_n + a_{n-1} - a_{n-2} - a_{n-3} \in \{0, \pm 1, \pm 2\} \quad [\text{Eqn. (3)}]$$

where the sequence $a_n$ is defined as a sequence of symbols selected from the alphabet 0 and 1, equal to the sequence EPR4 pre-coder output samples, and $f_k$, L, d are the tap weights, length and delay for the feed-forward equalizer as discussed above. The trellis diagram for the Viterbi detector used with EPR4 systems is shown in FIG. 1C.

Furthermore, with EPR4/DFE the multi-level symbol detector 113 is a 5 level slicer where $\hat{y}_n$ is selected from the set of (−2, −1, 0, +1, +2) or an equivalent five symbol alphabet. About seven taps are used in the feed-forward FIR filter 106 and in the feedback FIR filter 114, having weights determined adaptively (either on line or offline) according to particular implementation of this invention. It is expected that the number of taps ranges from 3 to 15 or more.

The code and rate vary with system architecture. For the PR4 system, a rate 8/9, (0, 4/4) code is appropriate as is the rate 8/10 MSN code discussed above. For the DFE and EPR4 system, the rate 8/9, (0,4) may be specified. Higher code rates could be used, such as a 16/17 code. However the implementation complexity changes with higher rate codes.

According to the system of FIG. 1, the sequence of symbols $\hat{y}_n$ is produced from magnetic recording channel by producing a readback signal from the magnetic recording medium. The readback signal is typically an analog signal on line 102 that is supplied to an analog filter 103. A sequence of digital values is produced from the output of the analog and applied to a feed-forward filter, such as a FIR filter. The filter used for feed-forward equalization produces a sequence of samples $x_n$. Decision feedback equalization is applied to the sequence of samples to produce equalized samples $y_n$. The equalized samples are used for the purposes of producing user symbols by means of a maximum-likelihood sequential detector, such as a Viterbi detector. Also, the equalized samples are used for the purposes of producing a sequence of detected symbols $\hat{y}_n$ for use in producing a sequence of equalization feed back values $e_n$, by filtering the detected symbols in a feedback filter 114, such as an FIR filter. A unit delay is inherent in the decision feedback equalization circuit. This provides that a symbol $\hat{y}_{n-1}$ which corresponds to the equalized sample $y_{n-1}$ of the immediately preceding sample interval is used for the purpose of producing the equalization feedback value $e_n$ for the current sample interval. The single sample interval delay assures rapid response and best possible feedback equalization.

For PR4 (and for EPR4 with some modification), the FIR filter in the feedback loop can be implemented without multipliers by normalizing the output of the multi-level symbol detector to +1, 0 and −1 for the three level detector. In this way, simple adders can be used for implementing the equalization feedback filter, without the requirement of multipliers. Alternatively, the filters are implemented using look up tables, to simplify the processing required in the feedback loop.

Figure 2:
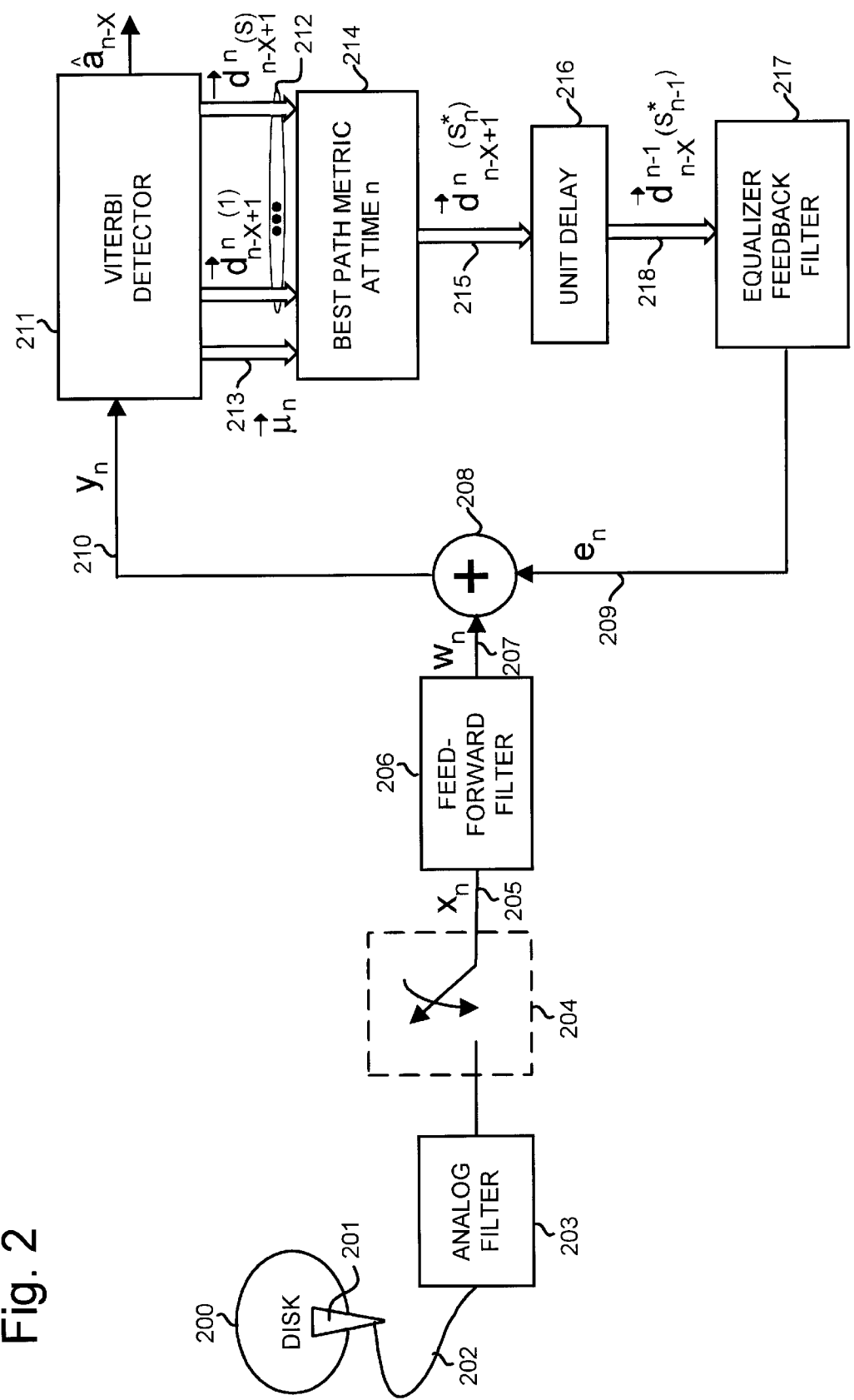
FIG. 2 is a schematic block diagram of an alternative implementation present invention, in which symbol detection in the decision feedback equalization loop is based on selecting a best path from a Viterbi detector as the feedback values.

FIG. 2 illustrates an alternative implementation of the PRML/DFE circuit according to this invention. The implementation of FIG. 2 can be used with PR4 with DFE, EPR4 with DFE, encoded channel memory systems, such as the PR4/DFE with MSN coding discussed above. According to the system of FIG. 2, the disk stores a sequence of data values in a magnetic recording medium. Transducer 201 is used to produce on line 202 a readback signal that is applied to an analog filter 203. The output of the analog filter is supplied to a sampler 204, which produces the sequence of digital values 205. The sequence of digital values 205 is supplied to a feed-forward filter 206 to produce the sequence of sample values $w_n$ on line 207. The sequence of sample values $w_n$ in the system of FIG. 2 is applied to a summing block 208, where it is combined with a sequence of equalization feedback values $e_n$ from line 209 to produce a sequence of equalized sample values $y_n$ on line 210. These elements 201–208 in FIG. 2 correspond to similar elements in FIG. 1 and are implemented using the same techniques. The sequence of equalized sample values $y_n$ is supplied to a Viterbi detector 211. The user data symbols $\hat{a}_n$ are generated in the usual manner by the Viterbi detector. As known in the art, the Viterbi detector can be characterized by the following points for each state j of the detector:

(1) stores $\mu_n(j)$, the state metric associated with the best path ending in state j at time n;

(2) stores or can easily regenerate the most recent "X" expected readback samples associated with the best path ending in state j at time n; and (3) stores or can easily regenerate the most recent "X" user data symbols associated with the best path ending in the state j at time n.

In particular the note that the output of the Viterbi detector as seen by the user are the user data symbols (i.e. $\hat{a}_n$), and not the corresponding sequence of expected readback samples (i.e. $d_n$).

Thus, a plurality of detector paths 212 is stored in the Viterbi detector 211. An array of state metrics 213 is also stored in the Viterbi detector. The plurality of detector paths and the array of state metrics are applied to detector logic 214, which selects a detector path having the best state metric at time n, as output on line 215. Thus, an array of symbols in a detector path is selected by logic 214 and applied with a unit delay 216, as parallel inputs on line 218 to an equalizer feedback filter 217. In FIG. 2, the variables are defined as follows:

(1) $w_n$ is the input to the junction 208 at time n;

(2) $d_{n-x}(j), d_{n-x+1}(j), \ldots, d_n(j)$ the most recent X expected readback samples associated with the best path ending in state j at time n;

(3) $\{\mu_n(1) \ldots, \mu_n(S)\}$ is the state metric vector where $\mu_n(j)$ is the path metric for the best path ending in state j at time n, and j=1, 2, ..., S all symbols in the input alphabet;

(4) S* is the state with the best path metric at time n (i.e. $\mu_n(S^*) \leq \mu_n(j)$ for all states j=1, . . . , S;

(5) $e_n$ is the output of the equalizer feedback filter at time n; and (6) $y_n$ is the Viterbi detector input sample at time n; and (7) {n} is the output data of the Viterbi detector (i.e. user data).

Since the state metrics and path memory of the best paths ending in each state are needed for normal operation of a Viterbi detector, the scheme shown in FIG. 2 causes little or no increase in the complexity compared to the embodiment described with respect to FIG. 1. However, the embodiment of FIG. 2 is expected to yield better performance in some circumstances. In the scheme according to FIG. 1, errors by the symbol by symbol detector 113 propagate through the feedback filter creating more risk with regard to error propagation. In the scheme shown in FIG. 2, the inputs to the feedback filter are delivered in parallel and the entire sequence can change from one sample time to the next. Thus, error propagation through the feedback filter is potentially avoided in many circumstances.

Figure 3:
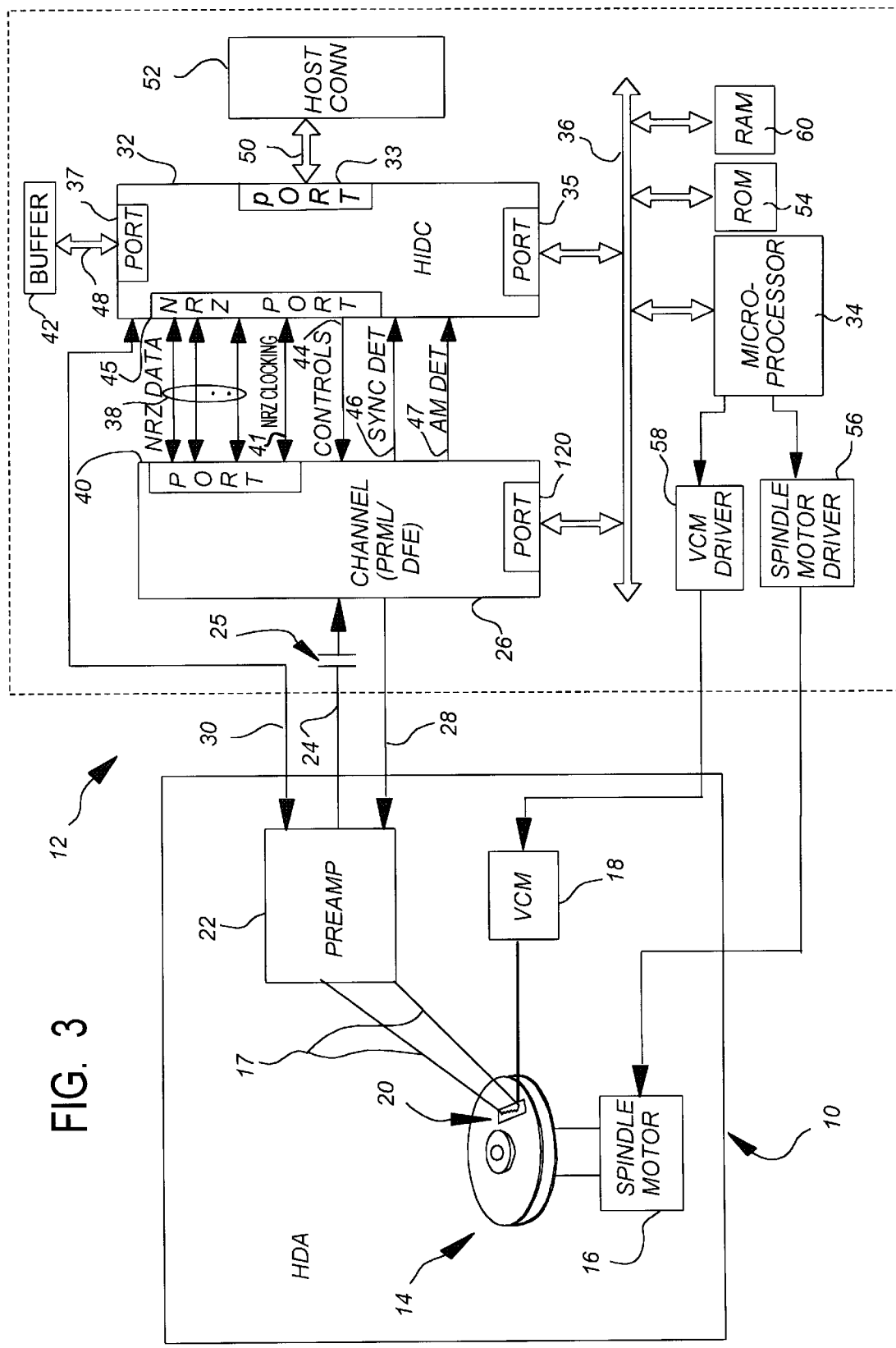
FIG. 3 is a schematic block diagram of a magnetic recording disk drive system and channel processor implementing this invention.

FIG. 3 illustrates a magnetic recording, hard disk drive system implementing a preferred embodiment of this invention. The disk drive system includes a head disk assembly (HDA) 10 and a printed circuit board assembly (PCB) 12. The HDA 10 includes a spindle motor 16, a plurality of magnetic disks 14, a transducer 20, such as a head stack assembly or other transducer technology available in the art, a pre-amplifier (preamp) 22 coupled to the transducer 20 across lines 17, and a voice coil motor (VCM) 18. PCB 12 includes a plurality of integrated circuits mounted thereon to implement the functional blocks illustrated in FIG. 3.

Referring to FIG. 3, HDA 10 includes two motors, i.e., spindle motor 16 and VCM 18. Spindle motor 16 is mechanically coupled to cause disks 14 to rotate. VCM 18 is coupled to the transducer 20 for positioning the transducer during read and write operations.

Preferably, disks 14 provide four magnetic surfaces. Each of the surfaces has a plurality of tracks arranged an embedded servo format. In an embedded servo format there are provided interspersed servo-data regions and the user-data regions; each servo-data region includes servo track segments for storing servo data and servo bursts, and each user-data region includes user track segments for storing user data. Each of four heads in transducer 20 provides for reading and writing with respect to a respective one of the four surfaces of disks 14. Alternative embodiments may have more or fewer disks. Each head in transducer 20 may employ inductive or magneto-resistive technology and generates a low level differential analog read signal 17 that is conveyed to signal inputs of preamp 22. Preamp 22 produces a read signal 24 that is an amplified, differential, analog read signal. HDA 10 also includes a path for conveying read signal 24 to PCB 12; a path for conveying a write data signal 28 to preamp 22; and a path for conveying preamp control signals 30 for preamp 22. Under control of control signals 30, preamp 22 operates in either a read mode or a write mode and in either case communicates with a selected head in transducer 20. Suitably, preamp 22 is implemented by a commercially available IC such as the SSI 32R2202 or SSI 32R2203, each of which is manufactured by Silicon Systems Inc., Tustin, Calif.

Suitably, spindle motor 16 is a multi phase, brushless DC motor. The prior art teaches suitable means for controlling spindle motor 16 to spin up to, and down from, a substantially constant angular velocity. VCM 18 is an element of a head-positioning servo system for transducer 20, and applies torque to rotate the head-stack assembly (HSA) 19 during a track-seeking operation and to maintain a desired angular position during a track-following operation. During a write operation, preamp 22 provides write current to a selected transducer 20; the write current changes polarity upon each change in binary value of write data signal 28. Read signals 17 and 24 have the same information content. Each serially defines servo data and user data during a user-data read operation; the head in servo data include gross-positioning data including track identification data, and fine-positioning data in the form of analog servo bursts. Thus, a selected head in transducer 20 and preamplifier 22 constitute a read means operative during a user-data read operation for reading data from the disk surface to produce a time-multiplexed analog read signal that during a revolution of the disk represents servo data during each of one set of time intervals; represents servo bursts during each of another set of time intervals; and represents-user data during each of another set of time intervals.

PCB 12 includes a channel 26 and a host interface and disk controller (HIDC) 32, each of which preferably is implemented as a single IC. Preferably, these two ICs in combination perform overall functions including basic timing functions. One such basic timing function entails generation of a "global clock" and the synchronization of the global clock to a servo sync signal derived from servo sync marks read from a disk. Certain prior art disk drives include a servo IC in addition to a channel IC and a disk controller IC, with the servo IC containing, circuitry for generating and synchronizing the global clock. U.S. Pat. No. 5,311,376 to Joan et al., discloses a disk drive that includes a servo section containing interval timers and a sync detector for detecting each servo sync mark and producing a sync detect signal to synchronize the interval timers. In one embodiment of this invention, HIDC 32 contains sector timer circuitry synchronized to a servo sync signal that channel 26 sends to HIDC 32. Such an architecture is preferred in circumstances in which channel 26 is implemented in an IC using biCMOS technology and in which HIDC 32 is embodied in an IC using CMOS technology. In an alternative embodiment in which both ICs use CMOS technology, channel 26 includes the servo sector timer circuitry.

Irrespective of the allocation of the sector timer function between channel 26 and HIDC 32, channel 26 provides, among other things, an electrical signal path for processing read signal 24 to produce a clocked, serial-by-symbol data signal (i.e., a decoded binary data signal and an accompanying clock signal). In this art, such an electrical signal path that processes an analog read signal produced by a preamplifier to produce such a clocked serial-by-symbol data signal is commonly called a "read channel." Channel 26 also provides an electrical signal path for processing a clocked serial-by-symbol data signal provided by HIDC 32 to produce a serial-by-bit write data signal for the signal input of preamp 22. In this art, such an electrical signal path is commonly referred to as a "write channel." The serial-by-symbol data signals propagate between channel 26 and HIDC 32 via a channel data bus 38. The clock signals for the serial-by-symbol data signals are shown collectively as NRZ CLOCKING 41 in FIG. 3.

Some of the important functions performed by the read channel within channel 26 are achieving bit synchronization and framing, i.e., achieving data block synchronization. As for bit synchronization, suitable means for performing this function are taught in the prior art; in particular, a Phase Locked Loop (PLL) circuit is commonly employed in read channels. The term "PLL circuit" as used herein has its customary meaning in this art. That is, a PLL circuit is a timing recovery circuit that produces an oscillating signal that is locked onto the same, or substantially the same, channel frequency as an input signal after several periods of the input signal. The timing recovery circuit and certain other circuits in the read channel each provide an adaptive circuit means that includes a feed-forward path, a feedback path, generating means in the feedback path for generating a state variable, and programmable means in the feed-forward path for processing the analog read signal in accordance with the state variable.

Channel 26 is coupled to receive read signal 24 through a set of coupling capacitors 25 and has a port 40 connected via bus 38 to a NRZ (Non-Return-to-Zero) port 45 in HIDC 32. Ports 40 and 45 and interconnecting bus 38 propagate data in a clocked, serial-by-symbol form referred to herein as non-return-to-zero (NRZ) form. The terms NRZ and NRZI (Non-Return to Zero Inverted) as used herein have their customary meaning in this art. That is, NRZ refers to a coding system in which a binary 1 is represented (at an instant in time indicated by a clock signal) by a first level or state and a binary 0 is represented (at an instant in time indicated by a clock signal) by a second level or state. NRZI refers to such a clocked coding system in which a binary 1 is represented by a transition from a first level or state to a second level or state and a binary 0 is represented by the absence of a transition.

During a user-data read operation, channel 26 processes read signal 24 to produce, on port 40, a clocked serial-by-symbol data signal that sequentially represents the same servo data and the same user data that the analog read signal represents. Channel 26 supports use of an EPR4 class partial-response maximum-likelihood (PRML) coding system with decision feedback equalization (DFE) as described above.

Irrespective of the allocation of the sector timer function between channel 26 and HIDC 32, HIDC 32 performs numerous control functions for the disk drive including host interface functions to manage transfer of data between the disk drive and the host, and certain disk controller functions to manage the operation of channel 26 in writing and reading data. Incident to such certain disk controller functions, HIDC 32 has circuitry for producing certain timing and control signals that are part of a set identified collectively as timing and control signals 44, which are sent between channel 26 and HIDC 32. As part of timing and control signals 44, HIDC 32 sends to channel 26 one of a set of signals collectively identified as write gate signal (WGATE) and one of a set of signals collectively identified as read gate signal (RGATE). In one embodiment, HIDC 32 sends to channel 26 as part of timing and control signals 44 one of a set of signals collectively identified as burst gate signal (BGATE), and one of a set of signals identified as AME-NABLE. In this embodiment, HIDC 32 includes sector timer circuits, and channel 26 sends a SYNC DET signal 46 and an AM DET signal 47 to HIDC 32 to synchronize the sector timer circuits. In an alternative embodiment, channel 26 includes sector timer circuits synchronized by SYNC DET signal 46 and AM DET signal 47, obviating the need to send these signals to HIDC 32. In the alternative embodiment, channel 26 internally produces BGATE and AM ENABLE, obviating the need for HIDC 32 to send a BGATE signal or an AM ENABLE signal to channel 26.

PCB 12 also includes a data buffer 42, a microprocessor 34, a read only memory ("ROM 54"), a writable random access memory ("RAM 60"), a VCM driver 58 for supplying current to VCM 18, and a spindle motor driver 56 for supplying current to spindle motor 16. PCB 12 also includes a host interface bus 50 for conveying commands and data between HIDC 32 and the host, a microprocessor bus 36, a buffer bus 48 for conveying data between HIDC 32 and data buffer 42, and a path for conveying control signals 30 that provide for bi-directional control interactions between preamp 22 and HIDC 32.

Suitably, microprocessor 34 is a commercially available microprocessor or microcontroller, such as Model No. 80C196NP2 available from Intel Corporation, Santa Clara, Calif. Microprocessor 34 executes instructions acquired from a stored control program to control disk drive functions These functions include reading and decoding host commands, starting up and controlling the speed of spindle motor 16, minimizing head-positioning servo off track error through control of VCM 18, managing reduced power modes of operation, and other disk drive functions. Microprocessor 34 includes an I/O port that is connected to microprocessor bus 36.

Microprocessor 34 suitably includes an embedded ROM that stores some of the control programs it uses. Here, control programs include the instructions microprocessor 34 executes, and tables, parameters or arguments used during the execution of these programs. Microprocessor control programs may also reside in any or all of ROM 54, RAM 60, or data buffer 42. Microprocessor 34 may also include a register set and may also include a writable random access memory (RAM).

Microprocessor 34 suitably has separate ports for directly communicating with spindle motor driver 56 and VCM driver 58. Channel 26 has a port 120 and HIDC 32 has a port 35 that connect to microprocessor bus 36, whereby microprocessor 34 is capable of communicating directly with either IC via microprocessor bus 36. Microprocessor bus 36 also enables microprocessor 34 to communicate directly with ROM 54, and RAM 60. In alternate embodiments, spindle motor driver 56 and VCM driver 58 may be connected to a single port or to microprocessor bus 36.

Channel data bus 38 includes an 8-bit wide (byte-wide) parallel path; alternate embodiments may employ more or fewer parallel bits for channel data bus 38. Depending upon applicable data transfer requirements, a 4-bit wide (nibble-wide) path or even a serial-by-bit path may be suitable for channel data bus 38.

Providing channel 26 with connections to both microprocessor bus 36 and channel data bus 38 enables microprocessor 34 and channel 26 to communicate via microprocessor bus 36 without interfering with high speed read/write data exchange between channel 26 and HIDC 32 via channel data bus 38.

Preferably, channel 26 includes circuitry to accept write data from HIDC 32 via channel data bus 38 and port 40, to encode write data, and to produce write data signal 28 that is conveyed via preamp 22 to selected transducer 20. Preferably, channel 26 encodes write data in accordance with Run Length Limited (RLL) code constraints. The term "RLL" as used herein has its customary meaning in this art. That is, RLL refers to a type of coding that restricts the minimum and maximum number of binary zeros between binary ones or vice versa.

Channel 26 also includes circuitry to process read signal 24, and, on a time-multiplexed basis, generate decoded digital user data, decoded digital servo data, and a digital representation of demodulated servo burst data. The decoded digital servo data and decoded digital user data are conveyed to HIDC 32 via port 40, channel data bus 38, and HIDC NRZ port 45. Microprocessor 34 acquires the demodulated servo burst data via microprocessor port 120 and microprocessor bus 36, and uses these data to perform fine-position head-positioning servo operations. An alternative embodiment may incorporate servo control circuitry in a servo IC in which case the demodulated servo burst data would be provided to such IC.

In addition to HIDC NRZ port 45, HIDC 32 includes a buffer port 37 connected to buffer bus 48, and host interface port 33 connected to host-interface bus 50. HIDC 32 includes a buffer manager-arbitrator circuit that manages access to data buffer 42 and manages bidirectional exchange of data between HIDC 32 and data buffer 42 via buffer bus 48. Host interface port 33 provides for communicating with the host via host interface bus 50 and host connection 52. Suitably, host interface port 33 includes a set of AT-bus Attachment (ATA) compatible host interface task file registers implemented as taught in the prior art. Both microprocessor 34 and other circuitry within HIDC 32 can read task file register contents. This preferred host interface port 33 also includes a set of host command registers and host data registers for parallel transfer of commands and data via host interface bus 50.

HIDC 32 also controls disk formatting and address translation. The translating of addresses includes translating a logical block address to a cylinder/head/sector address and provides for defect management. HIDC 32 also includes error detection and correction (EDAC) circuitry that is used to correct errors in user data that were read from disks 14 and stored in data buffer 42.

Data buffer 42 is implemented as random access memory such as a dynamic random access memory (DRAM) or a static random access memory (SRAM). Preferably, data buffer is implemented by at least one DRAM or SRAM IC that is affixed to PCB 12. In alternate embodiments, data buffer 42 and buffer bus 48 may be incorporated into HIDC 32. Data buffer 42 stores data recovered from a disk 14, data provided by the host that are to be recorded on a disk 14, and, optionally, disk drive commands, servo data and control programs for microprocessor 34. The buffer manager within HIDC 32 arbitrates access to data buffer 42 when contention for access to data buffer 42 occurs as consequence of various concurrent operations. Disk drive commands received from the host may be stored in data buffer 42 and be subsequently retrieved by microprocessor 34. Data buffer 42 preferably has sufficient capacity to hold multiple sectors of user data for both read and write operations; a suitable capacity is at least 64 KB and may be 512 KB or more where KB=1024 bytes.

ROM 54 is an optional conventional IC that stores at least part of the control program used by microprocessor 34. ROM 54 may be omitted in an embodiment in which microprocessor 34 includes embedded ROM suitable for replacing the functions of ROM 54.

RAM 60 is an optional, conventional RAM IC used to enlarge the high speed writable memory available to microprocessor 34. RAM 60 is included in PCB 12 when microprocessor 34 lacks sufficient internal RAM, and data buffer 42 cannot provide microprocessor 34 sufficient external storage or sufficiently fast external storage.

The host may be any electronic device that has an input/output (I/O) bus and interface connection means that is compatible with host connection 52, host interface bus 50 and host interface port 33. For example, the host may be a personal computer that includes an AT bus that has become a de facto standard for IBM PC-compatible computer systems and is referred to as the Industry Standard Architecture (ISA). A higher speed Enhanced AT bus has also been introduced. Various attachments to the AT bus have also become common for allowing peripherals, including disk drives, to more efficiently couple to the AT bus. For example, the Integrated Drive Electronics (IDE) attachment to the AT bus has become a very common interface for attaching disk drives to the standardized AT bus and is commonly referred to as the ATA (for AT bus Attachment) standard. Similarly, an interface standard referred to as Enhanced IDE (EIDE) is used to couple disk drives in the host. Preferably, the disk drive is adapted to attach to the host I/O bus via an EIDE connector. Alternatively, connection 52 may be implemented for connecting directly to a host I/O bus.

Alternative disk drive embodiments may conform to other interface specifications and appropriate other connections may be employed. Such alternate interfaces include the Small Computer Standard Interface (SCSI), the Serial SCSI Architecture (SSA) interface, the P1394 interface, the Fiber channel interface, and the parallel printer port interface. Each of numerous embodiments of a disk drive in accordance with this invention can be compatible with at least one of the above-noted alternate interfaces, or other suitable interfaces, used by the host.

Thus there is described how significant density improvement over conventional partial-response maximum-likelihood systems is provided by this invention with no degradation in bit error rate, by combining DFE with PRML. Potential density improvements over other systems, ranges from over 50 percent for embodiments using EPR4 in combination with DFE, with no degradation and bit error rate. Furthermore, this improvement in density is not significantly offset by increasing implementation complexity. Overall this invention provides an important advance in magnetic recording technology.

The foregoing description of a preferred embodiment of the invention has been presented for purposes of illustration and description. It is not intended to be exhaustive or to limit the invention to the precise forms disclosed. Clearly, many modifications and variations are apparent to practitioners skilled in this art in view of these teachings. It is intended that the scope of the invention be defined only by the following claims and their equivalents.

We claim:

1. A method for recovering symbols from a magnetic recording medium, the method comprising the steps of:

producing a readback signal from the magnetic recording medium, the readback signal representing a sequence of the symbols during a sequence of timing intervals, the sequence of symbols including symbols that are adjacent in that they are represented by the readback signal during consecutive timing intervals, and are subject to inter-symbol interference;

sampling the readback signal to produce a sequence of samples $\{x_n\}$ having amplitudes representing the readback signal during corresponding sample intervals n=1 through N;

processing the sequence of samples $\{x_n\}$ with a feedforward and feedback arrangement to produce a sequence of equalized samples $\{y_n\}$ that sequentially represent the symbols with substantially less inter-symbol interference between adjacent symbols, the processing step including:

a. filtering the sequence of samples $\{x_n\}$ with an asymmetrical feed-forward filter to produce a sequence of feed-forward equalized samples $\{w_n\}$, the asymmetrical feed-forward filter having a response that is asymmetrically balanced to cause preferential reduction of precursor inter-symbol interference between adjacent symbols represented by the samples $y_n$;

b. producing a sequence of detected symbols from the sequence of equalized samples $\{y_n\}$ such that each detected symbol corresponds to a successive timing interval;

c. filtering the sequence of detected symbols with an asymmetrical feedback filter to produce a sequence of equalization feedback values $\{e_n\}$ such that each detected symbol affects a group of the immediately succeeding equalization feedback values substantially more than any equalization feedback value defined subsequent to the group, the asymmetrical feedback filter having a response that is asymmetrically balanced to cause preferential reduction of postcursor inter-symbol interference between adjacent symbols represented by the samples $y_n$; and d. sequentially subtracting the equalization feedback values $e_n$ from the feed-forward equalized samples $w_n$ to produce the sequence of equalized samples $y_n$; and processing the sequence of equalized samples $\{y_n\}$ with a maximum-likelihood sequence detector to recover sequences of the symbols recovered from the magnetic recording medium.

2. The method of claim 1, wherein the step of producing a sequence of detected symbols includes producing a sequence of symbols $\{\hat{y}_n\}$, one at a time, from the sequence of equalized samples $\{y_n\}$.

3. The method of claim 2, wherein the asymmetrical feedback filter has tap weights such that detected symbol $\hat{y}_{n-1}$ corresponding to an equalized sample $y_{n-1}$ preceding the equalized sample $y_n$ by one sample interval has a non-zero weight.

4. The method of claim 2, wherein the asymmetrical feedback filter has tap weights such that a detected symbol $\hat{y}_{n-1}$ corresponding to an equalized sample $y_{n-1}$ preceding the equalized sample $y_n$ by one sample interval has a substantial weight.

5. The method of claim 2, wherein the asymmetrical feedback filter has tap weights such that a set of detected symbols $\hat{y}_{n-1}$ to $\hat{y}_{n-j}$ corresponding to equalized samples $y_{n-1}$ to $y_{n-j}$ preceding the equalized sample $y_n$ by one to $j$ sample intervals have together greater weight than any equal number of detected symbols preceding the equalized sample by more than $j$ sample intervals, and where $j$ is 5 or less.

6. The method of claim 2, wherein the asymmetrical feedback filter has tap weights such that a set of detected symbols $\hat{y}_{n-1}$ to $\hat{y}_{n-j}$ corresponding to equalized samples $y_{n-1}$ to $y_{n-j}$ preceding the equalized sample $y_n$ by one to $j$ sample intervals have together greater weight than any equal number of detected symbols preceding the equalized sample by more than $j$ sample intervals, and where $j$ is 3 or less.

7. The method of claim 2, wherein the step of producing a sequence of detected symbols $\{\hat{y}_n\}$ includes converting an equalized sample $y_n$ in the sequence of equalized samples in a multi-level detector to a detected symbol $\hat{y}_n$.

8. The method of claim 7, wherein the multilevel detector detects three levels.

9. The method of claim 7, wherein the multilevel detector detects five levels.

10. The method of claim 7, wherein the readback signal is characterized by a channel transfer polynomial of the form $P(D)=(1-D)(1+D)^m$, where $m$ is an integer and $D$ is a delay operator.

11. The method of claim 10, wherein $m$ equals 1.

12. The method of claim 10, wherein $m$ is greater than or equal to 2.

13. The method of claim 1, wherein the maximum-likelihood sequence detector comprises a Viterbi detector.

14. The method of claim 13, wherein the Viterbi detector includes a plurality of detector paths including respective sequences of detector path symbols, the Viterbi detector associating state metrics with the plurality of detector paths.

15. The method of claim 14, wherein the step of producing a sequence of detected symbols includes selecting in response to the state metrics a detector path in the plurality of detector paths, and providing the sequence of detector path symbols of the selected detector path as a current sequence of detected symbols.

16. A disk drive comprising:

a magnetic recording disk;

a readback circuit, coupled with the magnetic recording disk, that produces a readback signal from the magnetic recording disk, the readback signal representing a sequence of symbols during a sequence of timing intervals, the sequence of symbols including symbols that are adjacent in that they are represented by the readback signal during consecutive timing intervals, and are subject to inter-symbol interference;

the readback circuit sampling the readback signal to produce a sequence of samples $\{x_n\}$ having amplitudes representing the readback signal during corresponding sample intervals $n=1$ through $N$;

a decision feedback equalization circuit for processing the sequence of samples $\{x_n\}$ with a feedforward and feedback arrangement to produce a sequence of equalized samples $\{y_n\}$ that sequentially represent the symbols with substantially less inter-symbol interference between adjacent symbols, the decision feedback equalization circuit including:

a. an asymmetrical feed-forward filter for filtering the sequence of samples $\{x_n\}$ to produce a sequence of feed-forward equalized samples $\{w_n\}$, the asymmetrical feed-forward filter having a response that is asymmetrically balanced to cause preferential reduction of precursor inter-symbol interference between adjacent symbols represented by the samples $y_n$;

b. symbol detection means for producing a sequence of detected symbols from the sequence of equalized samples $\{y_n\}$ such that each detected symbol corresponds to a successive timing interval;

c. an asymmetrical feedback filter for filtering the sequence of detected symbols to produce a sequence of equalization feedback values $\{e_n\}$ such that each detected symbol affects a group of the immediately succeeding equalization feedback values substantially more than any equalization feedback value defined subsequent to the group, the asymmetrical feedback filter having a response that is asymmetrically balanced to cause preferential reduction of postcursor inter-symbol interference between adjacent symbols represented by the samples $y_n$; and d. means for sequentially subtracting the equalization feedback values $e_n$ from the feed-forward equalized samples $w_n$ to produce the sequence of equalized samples $y_n$; and a maximum-likelihood sequence detector coupled to the decision feedback equalization circuit that recovers a symbol $\hat{a}_n$ corresponding to the equalized sample $y_n$ in response to the sequence of equalized samples $\{y_n\}$.

17. The disk drive of claim 16, wherein the readback circuit includes:

a transducer that produces the readback signal from the disk;

an analog filter, connected to the transducer, which filters the readback signal to generate a filtered readback signal;

a sampler, connected to the analog filter, which produces the sequence of sample signals $\{x_n\}$ from the filtered readback signal.

18. The disk drive of claim 16, wherein the symbol detection means further producing a sequence of detected symbols $\{\hat{y}_n\}$ one at a time, from the sequence of equalized samples $\{y_n\}$.

19. The disk drive of claim 18, wherein the asymmetrical feedback filter has tap weights such that a detected symbol $\hat{y}_{n-1}$ corresponding to an equalized sample $y_{n-1}$ preceding the equalized sample $y_n$ by one sample interval has a non-zero weight.

20. The disk drive of claim 18, wherein the asymmetrical feedback filter has tap weights such that a detected symbol $\hat{y}_{n-1}$ corresponding to an equalized sample $y_{n-1}$ preceding the equalized sample $y_n$ by one sample interval has a substantial weight.

21. The disk drive of claim 18, wherein the asymmetrical feedback filter has tap weights such that a set of detected symbols $\hat{y}_{n-1}$ to $\hat{y}_{n-j}$ corresponding to equalized samples $y_{n-1}$ to $y_{n-j}$ preceding the equalized sample $y_n$ by one to j sample intervals have together greater weight than any equal number of detected symbols preceding the equalized sample by more than j sample intervals, and where j is 5 or less.

22. The disk drive of claim 18, wherein the asymmetrical feedback filter has tap weights such that a set of detected symbols $\hat{y}_{n-1}$ to $\hat{y}_{n-j}$ corresponding to equalized samples $y_{n-1}$ to $y_{n-j}$ preceding the equalized sample $y_n$ by one to j sample intervals have together greater weight than any equal number of detected symbols preceding the equalized sample by more than j sample intervals, and where j, is 3 or less.

23. The disk drive of claim 18, wherein the symbol detection means comprises a three level detector that translates each of the equalized sample values into one of three symbols.

24. The disk drive of claim 18, wherein the symbol detector comprises a five level detector that translates each of the equalized sample values into one of five symbols.

25. The disk drive of claim 16, wherein the data channel is characterized by a channel transfer polynomial of the form $P(D)=(1-D)(1+D)^m$, where m is an integer and D is a delay operator.

26. The disk drive of claim 25, wherein m equals 1.

27. The disk drive of claim 25, wherein m is greater than or equal to 2.

28. The disk drive of claim 16, wherein the maximum-likelihood sequence detector comprises a Viterbi detector.

29. The disk drive of claim 16, wherein the Viterbi detector includes a plurality of detector paths including respective sequences of detector path symbols, and associates state metrics with the plurality of detector paths, and the Viterbi detector selecting in response to the state metrics a detector path in the plurality of detector paths, and providing the sequence of detector path symbols of the selected detector path as a current sequence of detected symbols.

30. A read channel for recovering symbols from a data channel read from a magnetic recording disk, comprising:

a decision feedback equalization circuit for processing a sequence of sample signals $\{x_n\}$ having amplitudes representing the data channel during corresponding sample intervals n=1 through N, and which produces a sequence of equalized samples $\{y_n\}$, the decision feedback equalization circuit including:

a. an asymmetrical feed-forward filter for filtering the sequence of samples $\{x_n\}$ to produce a sequence of feed-forward equalized samples $\{w_n\}$, the asymmetrical feed-forward filter having a response that is asymmetrically balanced to cause preferential reduction of precursor inter-symbol interference between adjacent symbols represented by the samples $y_n$;

b. symbol detection means for producing a sequence of detected symbols from the sequence of equalized samples $\{y_n\}$ such that each detected symbol corresponds to a successive timing interval;

c. an asymmetrical feedback filter for filtering the sequence of detected symbols to produce a sequence of equalization feedback values $\{e_n\}$ such that each detected symbol affects a group of the immediately succeeding equalization feedback values substantially more than any equalization feedback value defined subsequent to the group, the asymmetrical feedback filter having a response that is asymmetrically balanced to cause preferential reduction of postcursor inter-symbol interference between adjacent symbols represented by the samples $y_n$; and d. means for sequentially subtracting the equalization feedback values $e_n$ from the feed-forward equalized samples $w_n$ to produce the sequence of equalized samples $y_n$; and a maximum-likelihood sequence detector coupled to the decision feedback equalization circuit that recovers a symbol $\hat{a}_n$ corresponding to the equalized sample $y_n$, in response to the sequence of equalized samples $\{y_n\}$.

31. The read channel of claim 30, wherein the symbol detection means further producing a sequence of detected symbols $\{\hat{y}_n\}$ one at a time, from the sequence of equalized samples $\{y_n\}$.

32. The read channel of claim 31, wherein the asymmetrical feedback filter has tap weights such that a detected symbol $\hat{y}_{n-1}$ corresponding to an equalized sample $y_{n-1}$ preceding the equalized sample $y_n$ by one sample interval has a non-zero weight.

33. The read channel of claim 31, wherein the asymmetrical feedback filter has tap weights such that a detected symbol $\hat{y}_{n-1}$ corresponding to an equalized sample $y_{n-1}$ preceding the equalized sample $y_n$ by one sample interval has a substantial weight.

34. The read channel of claim 31, wherein the asymmetrical feedback filter has tap weights such that a set of detected symbols $\hat{y}_{n-1}$ to $\hat{y}_{n-j}$ corresponding to equalized samples $y_{n-1}$ to $y_{n-j}$ preceding the equalized sample $y_n$ by one to j sample intervals have together greater weight than any equal number of detected symbols preceding the equalized sample by more than j sample intervals, and where j is 5 or less.

35. The read channel of claim 31, wherein the asymmetrical feedback filter has tap weights such that a set of detected symbols $\hat{y}_{n-1}$ to $\hat{y}_{n-j}$ corresponding to equalized samples $y_{n-1}$ to $y_{n-j}$ preceding the equalized sample $y_n$ by one to j sample intervals have together greater weight than any equal number of detected symbols preceding the equalized sample by more than j sample intervals, and where j is 3 or less.

36. The read channel of claim 31, wherein the symbol detection means comprises a three level detector that translates each of the equalized sample values into one of three symbols.

37. The read channel of claim 31, wherein the symbol detection means comprises a five level detector that translates each of the equalized sample values into one of five symbols.

38. The read channel of claim 30, wherein the data channel is characterized by a channel transfer polynomial of the form $P(D)=(1-D)(1+D)^m$, where m is an integer and D is a delay parameter.

39. The read channel of claim 38, wherein m equals 1.

40. The read channel of claim 38, wherein m equals 2.

41. The read channel of claim 30, wherein the a maximum-likelihood sequence detector comprises a Viterbi detector.

42. The read channel of claim 41, wherein:

the Viterbi detector recovering a sequence of symbols $\{â_n\}$ from the data channel in response to the sequence of equalized samples $\{y_n\}$, the Viterbi detector having a plurality of detector paths storing respective sequences of detector path symbols, and associating state metrics with the plurality of detector paths; and the symbol detection means is coupled to the Viterbi detector, the symbol detection means selecting a detector path in the plurality of detector paths in response to the state metrics, and providing the sequence of detector path symbols of the selected detector path as the sequence of detected symbols.

* * * * *